O. WOODWARD.
TYPE WRITING MACHINE.
APPLICATION FILED AUG. 15, 1905.

902,039.

Patented Oct. 27, 1908.
7 SHEETS—SHEET 4.

Witnesses
Joseph Phelps
Charles P. Smith

Inventor
Oscar Woodward
By his Attorney

O. WOODWARD.
TYPE WRITING MACHINE.
APPLICATION FILED AUG. 15, 1905.

902,039.

Patented Oct. 27, 1908.

WITNESSES:
Joseph Phelps
Charles F. Smith

INVENTOR:
Oscar Woodward
By Jacob Felbel
HIS ATTORNEY

UNITED STATES PATENT OFFICE.

OSCAR WOODWARD, OF NEW YORK, N. Y., ASSIGNOR TO WYCKOFF, SEAMANS & BENEDICT, OF ILION, NEW YORK, A CORPORATION OF NEW YORK

TYPE-WRITING MACHINE.

No. 902,039.  Specification of Letters Patent.  Patented Oct. 27, 1908.

Application filed August 15, 1905. Serial No. 274,288.

*To all whom it may concern:*

Be it known that I, OSCAR WOODWARD, citizen of the United States, and resident of the borough of Manhattan, city of New York, in the county of New York and State of New York, have invented certain new and useful Improvements in Type-Writing Machines, of which the following is a specification.

My invention relates to typewriting machines and more particularly to the type action thereof.

The main object of my invention is to provide a simple and efficient type action, one in which the parts can not only be readily assembled, but one in which, after assemblage, each part can easily be reached for adjustment or repair.

To the above and other ends which will hereinafter appear, my invention consists in the features of construction, arrangements of parts and combinations of devices to be hereinafter described and particularly pointed out in the appended claims.

In the accompanying drawings, wherein like reference characters designate corresponding parts in the various views.

Figure 1:
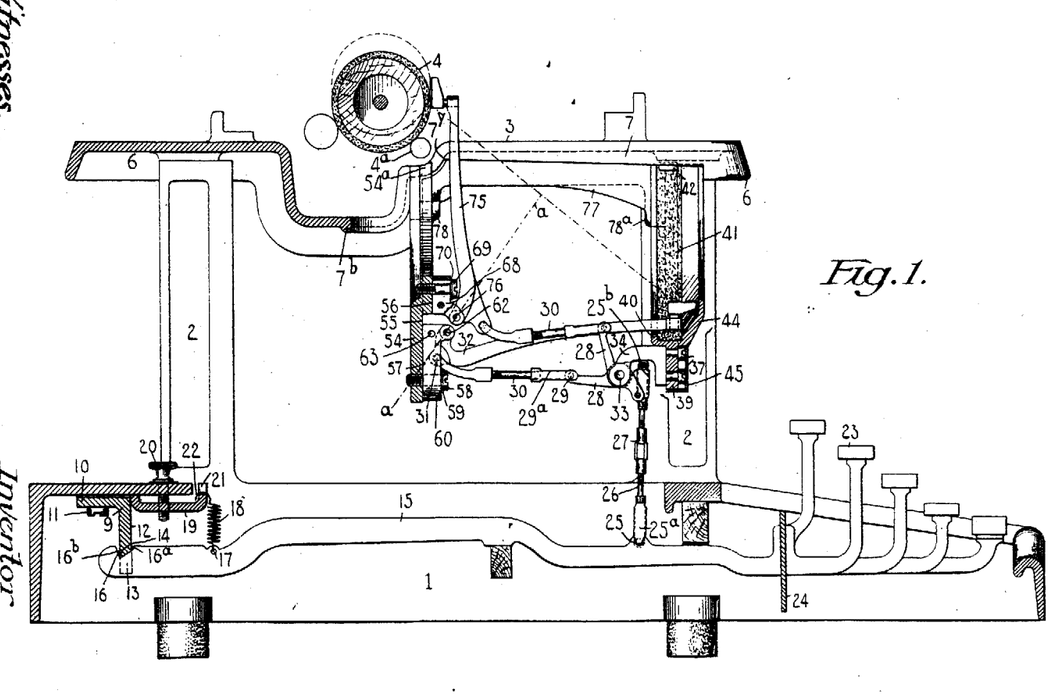
Figure 1 is a vertical, central, front to rear sectional view of a typewriting machine embodying my invention.
Figure 3:
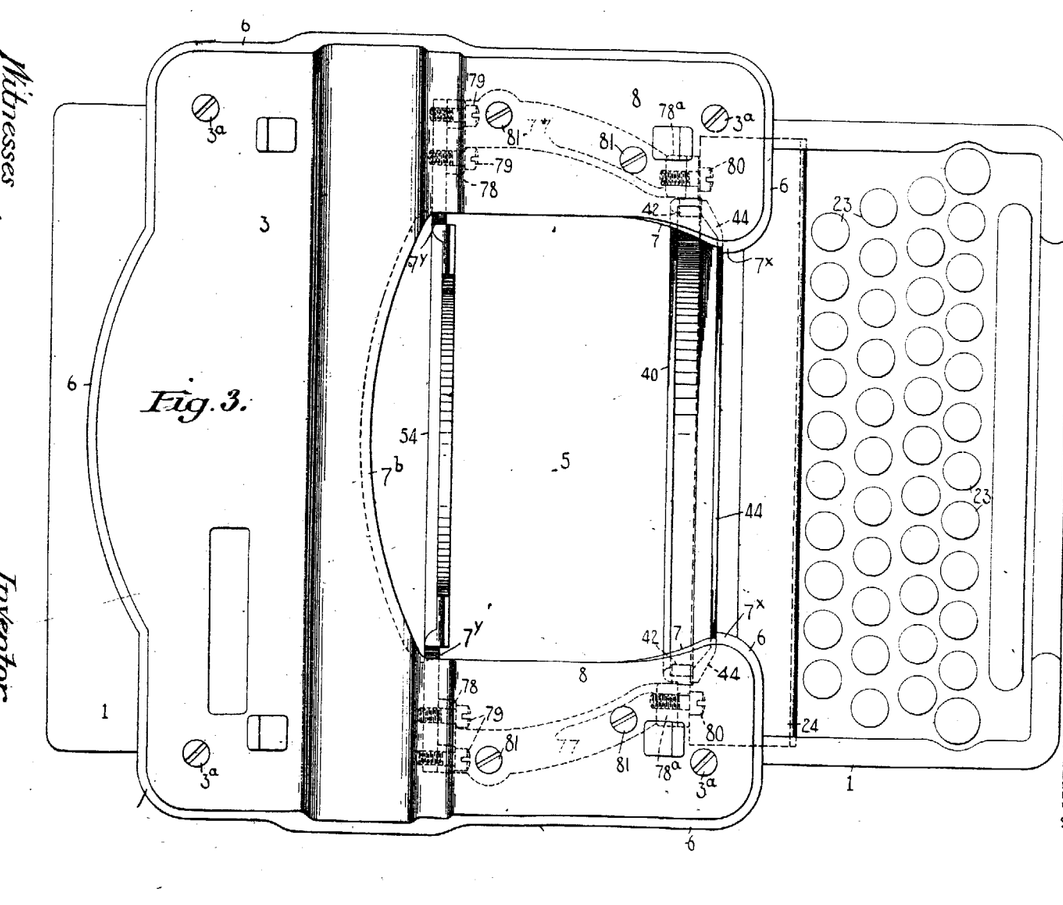
Fig. 3 is a top plan view of the machine with carriage parts removed.

The base 1 of the machine has corner posts 2 extending upwardly therefrom and a detachable top plate 3 is secured upon the corner posts by headed screws $3^a$, the stems of which pass through holes in the top plate and are threaded into the posts. A suitable carriage is mounted on the top plate to travel from side to side of the machine, the carriage supporting a cylindrical platen 4 and front feed rollers $4^a$. The top plate has a central recess 5 (see Fig. 3) which extends rearwardly from the front portion thereof to enable the type bars to swing upwardly and rearwardly to the printing point as indicated in Fig. 1. The outer edge of the top plate has a depending flange 6 that extends entirely around it to the points $7^x$, Fig. 3 where it intersects flanges, reinforcements or heads 7 that extend along the side edges of the top plate at the recessed portion 5 thereof and end at the trough $7^y$ in the top plate. The curved forward edge of the recessed portion of the top plate is also beaded as at $7^b$. The object of this reinforcement or flange is to prevent undue contraction of the top plate in the casting or manufacture thereof and so that the side members 8 to each side of the opening 5 therein may remain rigid with the rear body portion of the plate and not be sprung relatively thereto.

A combined fulcrum and guide or comb plate 9, which is angular in cross section, is secured by one of its angular members 10 to the base of the machine by screws 11. This plate extends transversely across the machine throughout the width thereof and the lower edge of the upright member 12 thereof has a series of saw-kerfs 13 therein. These saw-kerfs are cut diagonally or in an inclined direction so as to form a knife-edge fulcrum or bearing 14 at the bottom wall of each saw-kerf. The width of each slot corresponds substantially to the thickness of the associated key lever 15 which is received therein and guided by the side walls of the slot. Each key lever has an angular bearing slot or notch 16 in which the knife-edge fulcrum is received. One portion 16ª of the notch forms a flat shoulder that coöperates with the front face of the fulcrum plate to prevent an accidental rearward displacement of the key lever, whereas the rear inclined wall 16ᵇ of the notch coöperates with the rear face of the fulcrum plate and approaches the vertical sufficiently to prevent an accidental forward displacement of the key lever. The construction thus described enables the key levers to be readily mounted in place or dismounted when desired and yet prevents an accidental longitudinal movement or accidental unshipping of the key levers on the combined guide and fulcrum plate 9. Each of the key levers 15 is connected at 17 to a coiled contractile restoring spring 18, the upper end of which is secured to a plate 19. This plate extends transversely of the machine throughout or substantially throughout the width thereof and is secured to the base of the machine by one or more adjusting screws 20. The plate 19 has its front and rear edges bent up as shown in Fig. 1, and the upturned front edge of the plate is formed with a series of shallow slits 21 which receive the upper hook-like ends 22 of the restoring springs 18. The upturned rear edge of the plate 19 engaging the under side of the back shelf, serves as a fulcrum for the plate, so that the tension of all of the restoring springs may be simultaneously regulated by adjusting the screws 20, which are provided with milled heads for this purpose. It will be understood that the spacing of the slits 21 corresponds to the spacing between the key levers 15 and the saw-kerfs 13 in the fulcrum plate 9. The forward end of each key lever 15 is provided with the usual finger key 23, while the key levers themselves are guided at their forward ends in a comb plate 24 that is secured to the base of the machine in any suitable manner.

Each key lever has a perforation 25 therein for coöperation with a hook-like member 25ª on a two-part link 26 provided with a turn buckle 27 for purposes of adjustment. The upper end of each link 26 is likewise provided with a hook-like member 25ᵇ that engages the forward end of a sub-lever 28, the rear end of which sub-lever has an opening 29 to receive a hook-like member 29ª on a two-part actuating link 30, the parts of which are connected by a threaded connection to afford an adjustment of one part relatively to the other in a lengthwise direction, and spring members 25ᶜ maintain the links connected to the sub-levers, key levers and type bars. Both ends of each link 30 are constructed like the ends of the links 26 and facilitate the connection and disconnection of the link. The sub-levers 28 are each pivoted at 33 to a hanger 34 that is preferably a block-like hanger, as illustrated in detail in Figs. 7 and 8. Each of these hangers has two threaded openings 35 therein for the reception of retaining screws. The rear end portion of each hanger is bifurcated at 36 by a milling cut or otherwise and receives the associated sub-lever between the arms formed by the bifurcation From an inspection of Figs. 1 and 7 it will be seen that each hanger 34 is substantially in the form of an inverted U, one arm of which forms a foot-piece by which the hanger is secured to its supporting segment, whereas the other arm forms the support to which the associated sub-lever is pivoted. It will likewise be seen that when the sub-lever is in the normal position the forward end thereof, together with the upper end of its link 26, are received in the recess or space formed between the two arms of the substantially U-shaped hanger.

Headed screws 37 extend freely through openings or holes 38 in a segment 39. The heads of the screws extend towards the front of the machine and in front of the segment 39, whereas the stems thereof extend through the openings 38 and take into the threaded openings 35 in the hangers 34, two screws being employed for each hanger.

Figures 10, 11:
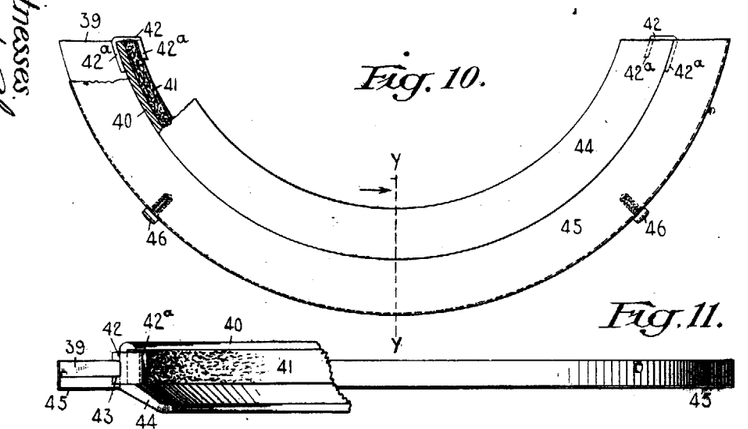
Fig. 10 is a detail front elevation of the combined sub-lever segment and type rest with a detachable shield or fender in place thereon, parts being broken away.
Fig. 11 is a top plan view of the same with parts broken away.
Figures 12, 21:
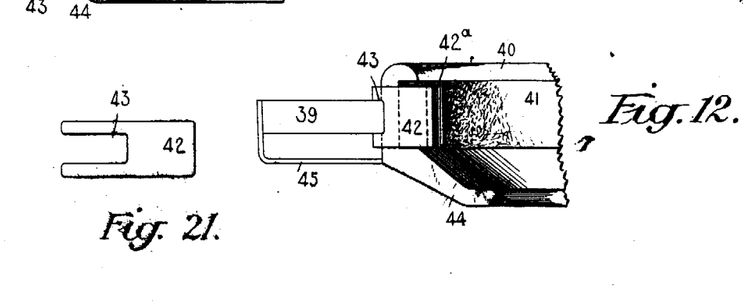
Fig. 12 is an enlarged detail fragmentary plan view of the parts shown in Fig. 10.
Fig. 21 is a plan view of the blank from which the pad retaining clip is formed.
Figure 13:
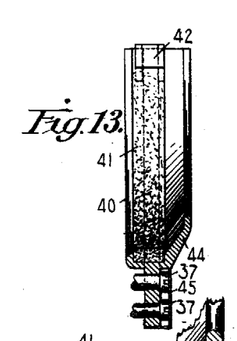
Fig. 13 is a transverse sectional view of the same parts, the view being taken on line $y-y$ of Fig. 10 and looking in the direction of the arrow at said line.
Figure 14:
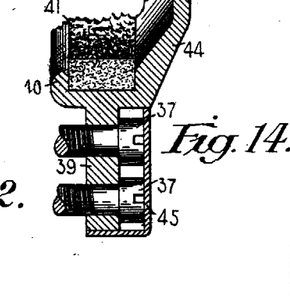
Fig. 14 is a view corresponding to that shown in Fig. 13, but on a larger scale.
Figure 23:
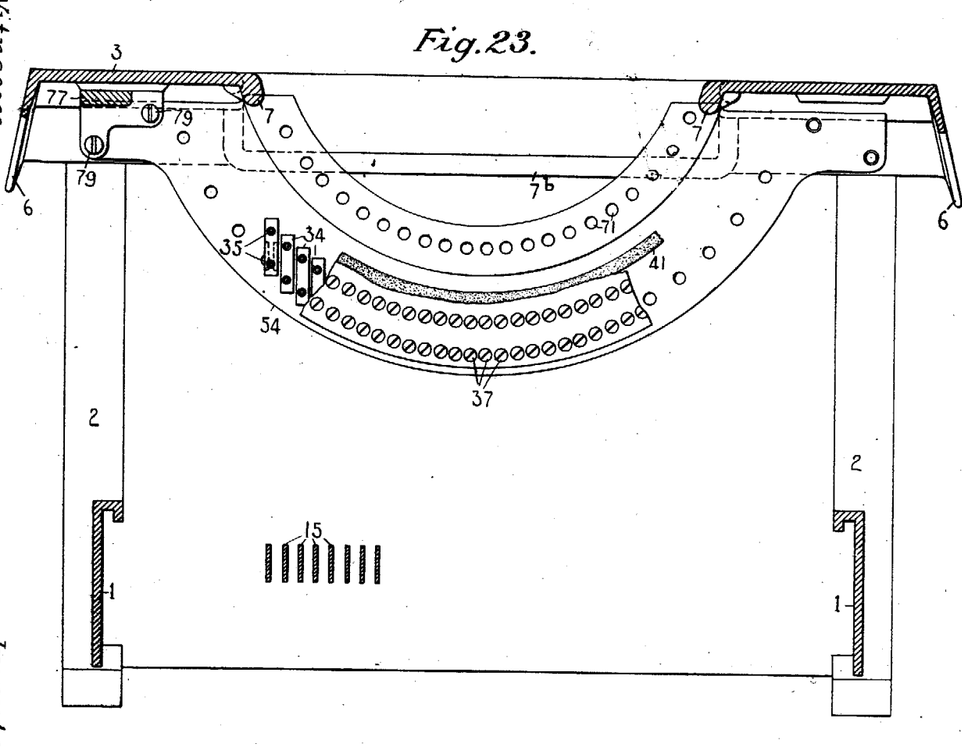
Fig. 23 is a vertical transverse sectional view of the machine, some of the parts being broken away to better illustrate other features of the construction.

From an examination of Fig. 23, it will be observed that the hangers 34 are all vertically disposed on the segment 39, though they have a segmental arrangement on the segment so that the sub-levers 28 receive a substantially up and down movement, each sub-lever moving in the same or substantially the same vertical plane as the corresponding key lever. Above the segment 39, and preferably formed as a part thereof, is a type rest which comprises a trough-like portion 40 in which a type bar pad 41 is seated. The type bar pad is maintained in place by detachable catches or clips 42 (see Figs. 10, 11, 12, 13 and 21) formed from plates, such as that represented in Fig. 21, which are bent into shape, best shown in Fig. 10 with arms 42ª, thus forming clips, each of which extends around the upper end of the pad and embraces a portion of the top thereof. Each clip is bifurcated at 43 so as to straddle the upper edge of the flange which constitutes the segment 39, the clips being held in position by friction. One of these clips or catches is provided at each end of the pad, this being sufficient to maintain said pad against accidental displacement from the trough in which it is seated.

Extending upwardly from the forward edge of the trough is a flange 44 that is curved to conform to the type rest and extends slightly higher than the upper edges of the type blocks so as to constitute a fender or shield for the forward ends of the type bars and the type blocks thereon. A cover plate 45 that is segmental in form and conforms to the shape of the segment 39 is secured thereto by headed screws 46, the stems of which pass freely through openings therein. The shield 45 thus covers the heads of the screws 37 which secure the hangers of the sub-levers in place. The segment 39 is preferably in the nature of a flange which projects from the type rest and the flange or segment 39; the type rest and the fender 44 may all be formed or cast as a single piece.

Figure 18:
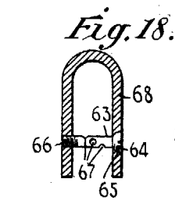
Fig. 18 is a transverse sectional view taken through one of the hangers.
Figure 19:
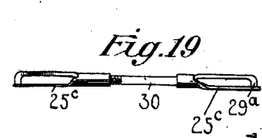
Figs. 19 and 20 are detail side views of the connecting links.
Figure 20:
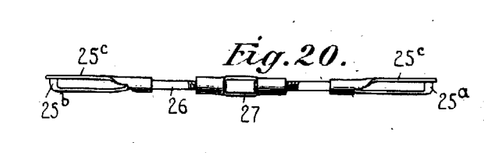

A vertically disposed type bar segment 54 is formed with two contact faces 55, 56 that lie in different vertical planes, the former a little back of the latter. Each of these contact or supporting faces is devoid of projections and therefore may be formed by a circular turning cut. Said faces constitute bearing faces against which the type bar hangers bear. The hangers are arranged in two sets, one above the other, those of the upper set being mounted on contact face 56 and those of the lower set on contact face 55. The hangers 57 of the lower set are bifurcated hangers which are radially arranged on the contact face 55 and are secured in place by headed screws 58, the heads of which bear on washers or securing plates 59 that in turn bear on the stem-like portions 60 of the hangers. The stems of the screws 58 are received in segmentally arranged threaded openings 61 (Fig. 4) in the segment. The arms of each of the hangers are adjusted relatively one to the other so as to afford a proper adjustment of the bearings for the type bar pivot 62 by a capstan-screw 63 (see Fig. 18). Each of these capstan screws has a head 64, and the stem thereof is received and free to turn in an opening 65 in one arm of the associate hanger, whereas the other end of the screw is threaded at 66 and is received in a threaded opening in the opposite arm of the hanger. Holes 67 are provided in each capstan screw between the side arms of the hanger for the reception of a tool, by means of which the screw may be turned and an adjustment of the said arms of the hanger afforded.

Figures 2, 22:
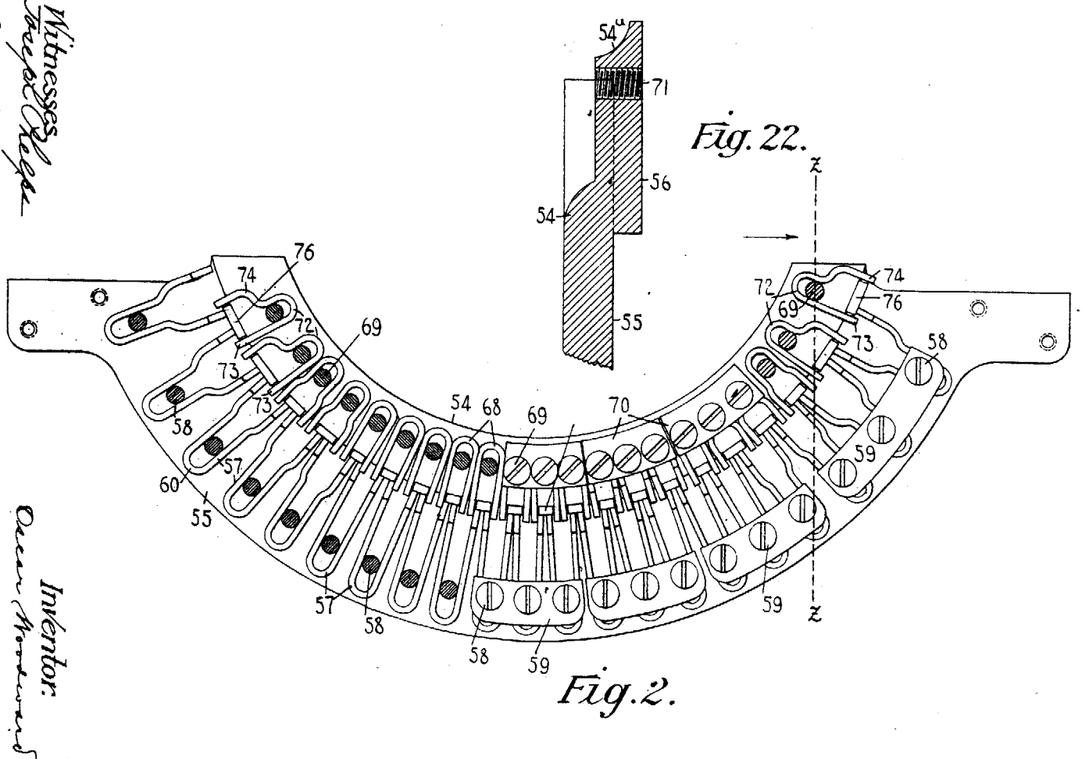
Fig. 2 is a front elevation of the type bar hanger segment showing particularly the arrangement of the hangers.
Fig. 22 is a vertical sectional view of the segment taken on the line $z-z$ of Fig. 2.
Figures 4, 5, 6, 7, 8, 9:
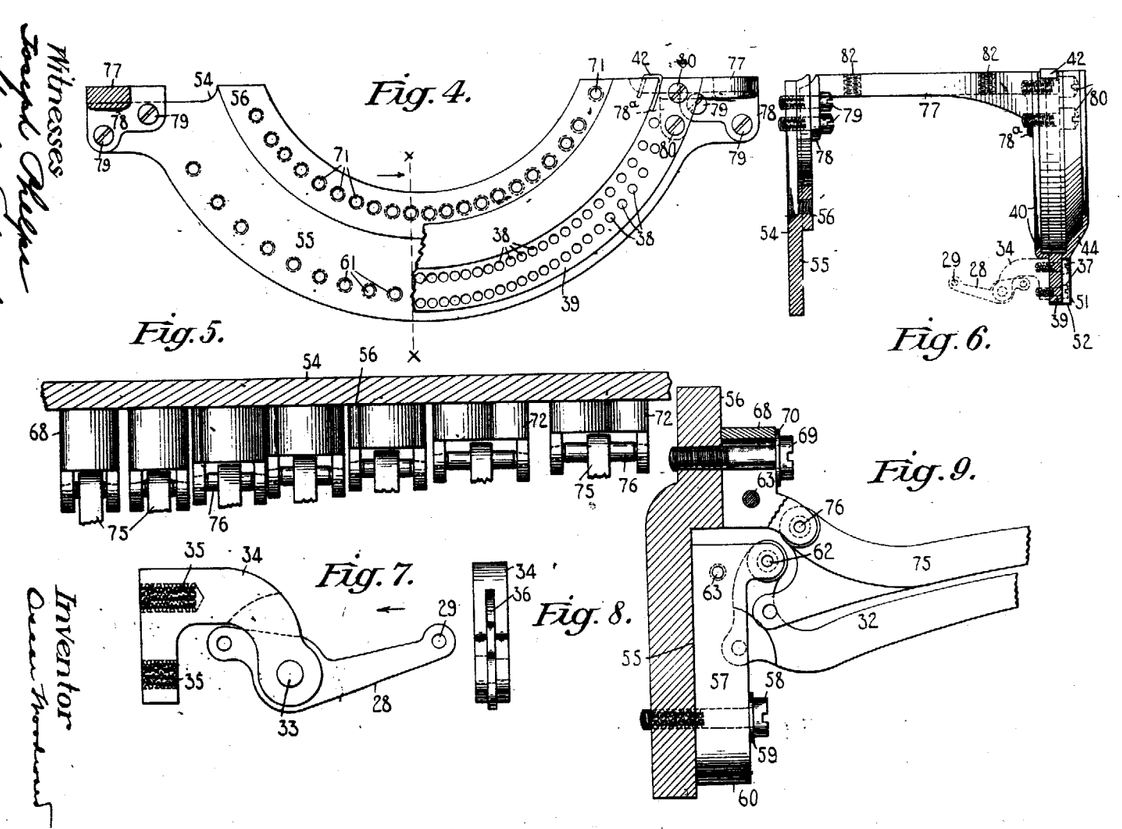
Fig. 4 is a front elevation with parts broken away, of the segments for the type bars and type bar actuating devices, together with the means for rigidly connecting said segments together.
Fig. 5 is an enlarged detail developed diagrammatic plan view of a portion of the type bar segment with some of the type bar hangers secured thereto.
Fig. 6 is a transverse sectional view of the parts shown in Fig. 4, the view being taken on the line $x-x$ of Fig. 4 and looking in the direction of the arrow at said line.
Fig. 7 is an enlarged detail side elevation of a sub-lever and its hanger.
Fig. 8 is an end view of the same looking in the direction of the arrow in Fig. 7.
Fig. 9 is an enlarged detail transverse sectional view showing a portion of the segment and two of the type bars and hangers secured thereto, certain of the parts being broken away to better illustrate other features of the construction.
Figure 15:
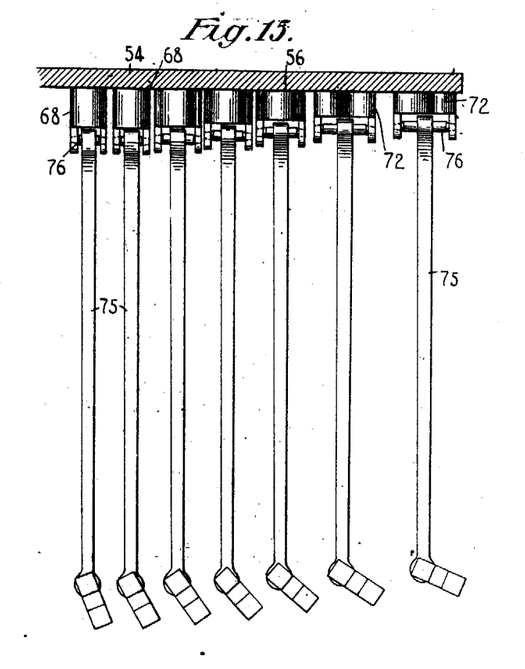
Fig. 15 is a detail developed diagrammatic plan view of a number of the type bars and hangers of one set.
Figure 16:
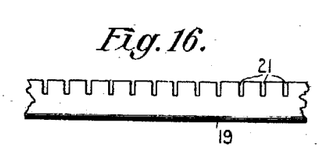
Fig. 16 is a fragmentary detail front elevation of the adjusting plate for the restoring springs.
Figure 17:
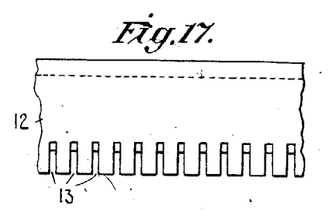
Fig. 17 is a fragmentary front elevation of the combined fulcrum and guide plate.

From an inspection of Figs. 2, 5 and 15, it will be seen that the hangers of those type bars near the middle of the series project farther forward from the face of the segment than those near the ends of the series, the width of the stock from which the hangers are made decreasing gradually from the center to the sides of the system. In other words, from the center to the sides of the system, the pivots 62 (and 76) of the type bars are of gradually decreasing distances from the face of the segment to which the hangers are secured and are parallel therewith. The purpose of this arrangement is to carry the type blocks at the sides of the system back further towards the rear of the machine than those at the center of the system, in order that more clearance may be provided for the type blocks at the sides of the system to decrease the liability of conflict between the adjacent type bars. The arrangement of the type blocks, effected by the means just described, is clearly illustrated in Fig. 15. Any desired number of the centrally located hangers may, if desired, be made of the same size so that the pivots for the type bars of these hangers are all at the same distance from the segment; and from certain aspects of my invention all of the hangers for each set may project forwardly to the same extent or may be made from the same width of stock so that the type bar pivots of the entire set of hangers will be at the same distance from the face of the segment to which said hangers are secured. The fastening means or screws for the hangers are located at gradually increasing distances apart as the sides of the system are approached, in order to still further provide for the proper clearance of the bars at the sides of the system and to afford sufficient room for the pivots of the type bars which increase in length as the sides of the system are approached and to provide room for the hangers which increase in width from the center to the sides of the system.

It should be understood that each set of type bar hangers is arranged in the manner described above. The type bar hangers of the upper set may be arranged in substantially the same manner as those of the lower series except that the bifurcated arms of the upper set of hangers extend towards the arms of the hangers of the lower set as shown in Fig. 2 and the hangers of the two sets overlap each other and are staggered relatively to each other. Thus the hangers 68 of the upper series are secured to the face 56 of the segment by screws 69, the heads of which bear against washers or securing plates 70 that in turn bear on the bifurcated stem-like portions of the hangers and secure them to the segment. The screws 69 have their threaded stems received in tapped openings 71 in the type bar segment. All of the central hangers 68 or those near the center of the system may be similar to the hangers 57 near the center of the lower set. I prefer, however, to make each of the hangers 72, near the terminal portions of the segment, or at least one of them, with one arm 73 substantially straight and radially disposed on the segment and to bend or off-set the other arm 74 from the securing screw 69 which holds the hanger in place. The bent arms of the terminal hangers are preferably arranged uppermost as indicated in Fig. 2 but the form of the intermediate hangers is not so material. The purpose of this arrangement is to decrease the height or extent of the segment, and yet get sufficient clearance between type bars and provide long pivots for the type bars. Thus it will be understood that if the terminal hangers of the upper row, and especially that hanger at the right hand end, were formed in the same manner as the terminal hangers of the lower row, for instance, the securing screws for the terminal hangers of the upper set would necessarily be located at a greater height than they are in the construction shown in Fig. 2. It would be necessary therefore to make the segment of greater height at the sides than is necessary when the terminal hangers, or one of them, is provided with one bent arm and one substantially straight arm, as indicated in the drawings. Where two rows of type bar hangers are employed, as in the present instance, it is not essential that the hanger at one end of the upper row be shaped in the manner indicated, inasmuch as the hanger nearest the end of the segment is a hanger of the lower row and plenty of room is provided at this point for securing the hanger in place without increasing the height of the segment, so therefore the advantage incident to the use of a hanger of the character specified will be attained in some cases where but one of said hangers is employed at one end of the system or segment.

The closeness and compactness of the parts without undue crowding will best be appreciated by an inspection of Fig. 1, from which it will be seen that the paper feed roller 4ª comes close to the cut-out portion 54ª at the top of the segment and from an inspection of Fig. 22 it will be seen that the highest hole 71 for the right-hand hanger comes close to the top edge of the segment. It will be observed that in the construction shown, wide pivot bearings are provided and that the pivot bearings for the terminal type bars in the uppermost arms of the hangers are co-extensive in height with or extend at even a greater height than the means for securing the hangers in place so that no additional room need be provided on the segment for the securing means for the terminal hangers even though the hangers are radially disposed and the stems thereof extend inwardly from the pivot bearings of the type bars. Otherwise expressed, the securing stem and securing screw for each of the terminal hangers are off-set from the longitudinal median plane of the hanger, or are off-set with reference to a median line extending between the hanger arms. This is an important feature as it enables me to provide a compact arrangement yet affording ample clearance of the type bars and wide and efficient bearings in order to secure the type bars against lateral deflection in the operation thereof. The type bars 75 are pivoted at 76 to the upper set of hangers and said pivots 76 stand nearer to the printing point and nearer to the front of the machine than the pivots 62 of the outer set of type bars and the relations of the pivots of the type bars of the two sets of hangers is such that each fore and aft pair of type bars have their pivots situated in an inclined plane represented, for instance, by the dotted line $a$ in Fig. 1. This plane is at right angles to a line drawn between the printing point and a type on one of the bars when the latter is at rest; and intersects said line about midway in the length thereof. This relative arrangement of the pivots of the two sets of type bars is such that while the type bars of the two sets are of different lengths the different types on the various bars will be brought to the printing point and in the normal positions of the type bars in the basket or type rest they will all extend to substantially the same transverse vertical plane. In other words the forward ends of the type bars will be in substantial transverse alinement when at rest.

From an examination of Figs. 1, 4 and 6 of the drawings it will be seen that the type bar segment 54 and the segment 39 of the sub-levers are united by cross brackets 77 so as to form a rigid frame. The brackets 77 are each provided with angular feet or securing members 78 and 78ª that extend at right angles to the length thereof. Two headed screws 79 have stems which pass freely through openings in the rear securing members and the threaded end portions of the stems are received in tapped openings in the segment 54. Headed screws 80 have stems which pass freely through openings in the segment 39 and engage at the threaded ends thereof in threaded openings in the feed or securing members 78ª. By these means a four-sided frame is formed by the connecting brackets 77 and the segments 39 and 54 and the entire frame may be secured to the top plate of the machine by four headed screws 81, the stems of which pass freely through holes in the top plate and are received at their lower threaded ends in screw threaded openings 82 in the connecting bars 77. By this construction a frame is provided in which the type bars, their actuating sub-levers, the intermediate links between the sub-levers and type bars and the connecting links 26 for the sub-levers may be assembled and secured in place outside of the frame of the machine and the various parts may afterwards be placed in the frame of the machine as a single part and secured in place by the four screws 81. This feature of my invention permits a rapid and accurate assemblage of the parts outside of the frame of the machine, thereby greatly facilitating the work and enabling the workman to place the various working parts of the type action, except the key levers thereof, in the frame of the machine at one time after they have been assembled. Furthermore, the manner of mounting the key levers 15 in place is such that they may be readily placed in position and connected to the actuating links 26 and may be readily dismounted when desired.

While I have described one form of mechanism embodied in my invention it should be understood that various changes may be made without departing from the spirit of my invention.

What I claim as new and desire to secure by Letters Patent, is:—

1. In a typewriting machine, the combination of a segment, and a hanger secured thereto, said hanger having a substantially straight arm and a bent arm, both of said arms bearing against the face of the segment to which the hanger is secured.

2. In a typewriting machine, the combination of a substantially vertically disposed segment, a series of type bar hangers secured thereto, and a series of type bars pivoted to said hangers, a terminal type bar hanger having a substantially straight arm and a bent arm, the bent arm of said terminal hanger being uppermost, and both arms of said terminal hanger bearing against the face of said segment to which said hanger is secured.

3. In a typewriting machine, the combination of a segment having two segmental securing faces at different elevations or distances from the body of the segment, and two series of bifurcated hangers with the bifurcated portions thereof extending towards each other, a terminal hanger of one series having a bent arm and a substantially straight arm, the bent arm of said terminal hanger being outermost.

4. In a typewriting machine, the combination of a segment having two segmental securing faces at different elevations or distances from the body of the segment, and two series of bifurcated hangers with the bifurcated portions thereof extending towards each other, the hangers of one series being staggered relatively to the hangers of the other series, and a terminal hanger of one series having a bent arm and a substantially straight arm, the bent arm of said terminal hanger being outermost.

5. In a typewriting machine, the combination of a segment, a face thereof to which type bar hangers are secured being in a single plane, a series of type bar hangers, and a series of type bars, the pivots of which are arranged nearer the securing face of the segment as the sides of the system of type bars are approached.

6. In a typewriting machine, the combination of a segment, a face thereof to which type bar hangers are secured being in a single plane, a series of type bar hangers, and a series of type bars, the pivots of which are progressively nearer the securing face of the segment from the center to the sides of the system of type bars.

7. In a typewriting machine, the combination of a segment, a face thereof to which type bar hangers are secured being in a single plane, a series of type bar hangers, and a series of type bars, the distance from the contact faces of the bases of the hangers to the pivots of the type bars varying from the center to the sides of the system of type bars.

8. In a typewriting machine, the combination of a segment, a face thereof to which type bar hangers are secured being in a single plane, a series of type bar hangers, and a series of type bars, the distance from the contact faces of the bases of the hangers to the pivots of the type bars gradually decreasing from the center to the sides of the system of type bars.

9. In a typewriting machine, the combination of a type bar segment having two segmental securing faces in different parallel planes, two sets of segmentally arranged type bar hangers, one set secured to each of said faces, the distance between pivots of the type bars of each set and the associated securing face of the segment being less at the sides of the segment than at the center thereof.

10. In a typewriting machine, the combination of a type bar segment having two segmental securing faces in different parallel planes, two sets of type bar hangers, one set secured to each of said faces, the distance between pivots of the type bars of each set and the associated securing face of the segment gradually decreasing from the center to the sides of the segment.

11. In a typewriting machine, the combination of a type bar segment, a series of radially and segmentally arranged individual type bar hangers secured to said segment, a series of upwardly and rearwardly striking type bars pivoted to said type bar hangers, a sub-lever carrying segment substantially parallel with the type bar segment, a series of segmentally arranged individual sub-lever hangers secured to said sub-lever carrying segment, a series of horizontally disposed segmentally arranged sub-levers pivoted to said sub-lever hangers and which extend fore and aft of the machine in parallel planes, key levers, upwardly extending links connecting said key levers and the forward ends of said sub-levers, and links that extend fore and aft of the machine from said sub-levers to said type bars and which are in alinement with their respective sub-levers.

12. In a front-strike typewriting machine, the combination of two segments of about the same size arranged one forward of the other at about the same height, the rear segment carrying type bar hangers and the front segment sub-lever hangers, upwardly and rearwardly striking type bars pivoted to the type bar hangers, substantially horizontally disposed sub-levers pivoted to the hangers on the front segment, finger keys connected to the sub-levers, connections from the sub-levers to the type bars, and means for affording a simultaneous removal of said segments, type bars and sub-levers as a whole from the machine.

13. In a front-strike typewriting machine, the combination of two segments of about the same size arranged one forward of the other at about the same height, the rear segment carrying individual type bar hangers and the front segment carrying individual sub-lever hangers, upwardly and rearwardly striking type bars pivoted to the type bar hangers, segmentally arranged horizontally disposed sub-levers pivoted to the hangers on the front segment and extending in horizontal planes fore and aft of the machine, key levers connected to the sub-levers, links that extend rearwardly from the sub-levers to the type bars and which are arranged in alinement end to end with said sub-levers.

14. In a typewriting machine, the combination of a segment having a depending flange, type bar actuating devices secured to said flange, a trough formed as a part of the segment above the flange, a type bar pad seated in said trough, and detachable means carried by the segment for securing said pad in the trough.

15. In a typewriting machine, the combination of a trough, a type bar pad seated in said trough, and detachable clips that are situated at the ends of the trough and coöperate with the ends of the pad and maintain it seated in the trough.

16. In a typewriting machine, the combination of a trough, a type bar pad seated in said trough, clips that are situated at the ends of the trough and coöperate with the ends of the pad and maintain it seated in the trough, the clips being frictionally held to detachably secure them in place.

17. In a front-strike typewriting machine, the combination of an upright segment, type bar actuating devices carried thereby, a type bar rest which is also carried by said segment, and a cover plate detachably connected to said segment and situated at the front thereof.

18. In a typewriting machine, the combination of a segment, type bar actuating devices carried thereby, a fender that extends up in front of the type bars at the forward ends thereof and which is connected to said segment, and a cover plate located below said fender and detachably connected to said segment.

19. In a typewriting machine, the combination of a segment, type bar actuating devices carried thereby, a trough formed on said segment, a type bar pad seated in said trough, a fender that extends in front of the type bars and pad and which is connected to said segment, and an independent cover plate detachably connected to said segment.

20. In a typewriting machine, the combination of a segment having a depending flange, type bar actuating devices secured to said flange, a trough formed as a part of the segment above the flange, a type bar pad seated in said trough, a fender that is formed on said segment and extends upwardly in front of the type bars and the pad therefor, and a cover plate located below the fender and detachably connected to the segment.

21. In a front-strike typewriting machine, the combination of a series of upwardly and rearwardly striking type bars, a series of type bar actuating devices, a segment at the front of the machine carrying said type bar actuating devices, and a cover plate located in front of said type bar actuating devices and detachably secured to the segment.

22. In a typewriting machine, the combination of a series of type bars, a series of type bar actuating devices, a series of hangers therefor, a segment at the front of the machine for supporting said hangers, and a cover plate located in front of said hangers and detachably secured to the segment.

23. In a typewriting machine, the combination of a series of type bars, a substantially vertically disposed segment at the front of the machine, a series of hangers carried at the back of the segment, screws that pass from the front of the segment through it to secure said hangers in place, and a plate that covers said screws and which is detachably connected to said segment at the front face thereof.

24. In a typewriting machine, the combination with a series of key levers and restoring springs therefor, of a plate that has two edges that are at an angle to the body of the plate, one of said edges constituting a fulcrum on which the plate turns and the other edge being provided with means for engaging one end of each of said springs and means for effecting an adjustment of said plate on its fulcrum.

25. In a typewriting machine, the combination with a series of key levers and restoring springs therefor each connected at one end to a key lever, of a plate that has two edges that are at substantially right angles to the body of the plate, one of said edges constituting a fulcrum on which the plate turns and the other edge having a series of notches in which the other ends of the springs are seated, and means for effecting an adjustment of said plate on its fulcrum.

26. In a typewriting machine, the combination with a series of key levers and restoring springs therefor each connected at one end to a key lever, of a plate that has two edges that are at substantially right angles to the body of the plate, one of said edges constituting a fulcrum on which the plate turns and the other edge having a series of notches in which the other ends of the springs are seated, and one or more screws that coöperate with said plate and with a fixed portion of the machine for effecting an adjustment of said plate on its fulcrum.

27. In a typewriting machine, the combination of a type bar segment or support, a bifurcated type bar hanger secured thereto, the securing stem of the hanger being off-set to one side of the longitudinal center of the hanger, and a single type bar pivoted to both arms of said hanger, the pivot of the type bar being parallel to the face of the segment or support to which the hanger is secured.

28. In a typewriting machine, the combination of a type bar segment, a bifurcated hanger, the securing stem of the hanger being off-set to one side of the longitudinal center of the hanger, and the arms formed by the bifurcated portion of the hanger bearing against the face of the segment and having the bearing edges thereof in the same plane as the face of the segment, and a single type bar pivoted to both arms of the hanger.

29. A bifurcated type bar hanger having its securing stem off-set with reference to a median line extending between the hanger arms, the pivot bearings in the hanger arms being in a plane parallel to the base of the securing stems, and a type bar pivoted to both hanger arms.

30. In a typewriting machine, the combination of a series of restoring springs, a trough-like plate that has transverse slots in one edge thereof, one end of each spring being received in one of said slots and hooking over the edge thereof, and means for affording an adjustment of said plate to regulate the tension of said spring.

31. In a typewriting machine, the combination of upwardly and rearwardly striking type bars, substantially horizontally disposed sub-levers for actuating said type bars, a segmental series of inverted substantially U-shaped parallel hangers for said sub-levers, one arm of each hanger forming a foot by which it is secured to its support and the other arm forming a support to which a sub-lever is pivoted, one end of a sub-lever extending into the recess or space formed between the arms of the associated hanger when the sub-lever is in the normal position, and a series of connecting links which extend into said recesses or spaces in the hangers and connect with the sub-levers.

Signed at Ilion in the county of Herkimer and State of New York, this 12th day of August, A. D. 1905.

OSCAR WOODWARD.

Witnesses:
 JOHN H. EXCEEL,
 ADELBURT C. SHERMAN.